US010448682B1

(12) United States Patent
Owens (10) Patent No.: US 10,448,682 B1
(45) Date of Patent: Oct. 22, 2019

(54) ILLUMINATED SAFETY HARNESS (71) Applicant: Barry Owens, Mattapan, MA (US)

(72) Inventor: Barry Owens, Mattapan, MA (US)

(*) Notice: Subject to any disclaimer, the term of this patent is extended or adjusted under 35 U.S.C. 154(b) by 0 days.

(21) Appl. No.: 16/167,650

(22) Filed: Oct. 23, 2018

(51) Int. Cl.
F21V 21/08 (2006.01)
A41D 13/01 (2006.01)
B62J 6/16 (2006.01)
B60Q 1/26 (2006.01)

(52) U.S. Cl.
CPC ........... A41D 13/01 (2013.01); B60Q 1/2673 (2013.01); B62J 6/16 (2013.01)

(58) Field of Classification Search
CPC ......... A41D 13/01; B60Q 1/2673; B62J 6/16; F21V 33/0008
USPC .................... 362/103, 105–108, 473–474
See application file for complete search history.

(56) References Cited

U.S. PATENT DOCUMENTS

| 6,517,214 B1 | 2/2003 | Mitchell, Jr. |
| 6,558,016 B1 | 5/2003 | Restauro |
| 6,834,395 B2 | 12/2004 | Fuentes |
| 6,925,654 B2 | 8/2005 | De Silva |
| D739,085 S | 9/2015 | Tadeo |
| 9,310,068 B1 | 4/2016 | Mason |
| 2007/0063831 A1 | 3/2007 | Perkins |
| 2015/0276202 A1 | 10/2015 | Haslem, Sr. |
| 2017/0151989 A1* | 6/2017 | Daniels .................... B62J 6/005 |

FOREIGN PATENT DOCUMENTS

GB 2331801 6/1999

* cited by examiner

Primary Examiner — Jason M Han (57) ABSTRACT

The illuminated safety harness is a garment. The illuminated safety harness is worn as personal protective equipment. The illuminated safety harness is configured for use with a bicycle. The bicycle is further defined with a handlebar. A rider rides the bicycle. The illuminated safety harness provides a plurality of illuminated traffic control signals that indicates an intention to change the direction of travel of the bicycle. The plurality of illuminated traffic control signals are wirelessly controlled. The wireless control of the plurality of illuminated traffic control signals is accessible from the handlebar of the bicycle. The illuminated safety harness comprises a harness and a safety circuit. The harness forms the garment worn by the rider. The safety circuit generates the plurality of illuminated traffic control signals. The portion of the safety circuit mounts on the handlebar. A portion of the safety circuit mounts on the harness.

17 Claims, 6 Drawing Sheets

ILLUMINATED SAFETY HARNESS

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of personal and domestic articles including apparel, more specifically, a protective garment with luminous safety means. (A41D13/01)

SUMMARY OF INVENTION

The illuminated safety harness is a garment. The illuminated safety harness is worn as personal protective equipment. The illuminated safety harness is configured for use with a bicycle. The bicycle is further defined with a handlebar. A rider rides the bicycle. The illuminated safety harness provides a plurality of illuminated traffic control signals that indicates an intention to change the direction of travel of the bicycle. The plurality of illuminated traffic control signals are wirelessly controlled. The wireless control of the plurality of illuminated traffic control signals is accessible from the handlebar of the bicycle. The illuminated safety harness comprises a harness and a safety circuit. The harness forms the garment worn by the rider. The safety circuit generates the plurality of illuminated traffic control signals. The portion of the safety circuit mounts on the handlebar. A portion of the safety circuit mounts on the harness.

These together with additional objects, features and advantages of the illuminated safety harness will be readily apparent to those of ordinary skill in the art upon reading the following detailed description of the presently preferred, but nonetheless illustrative, embodiments when taken in conjunction with the accompanying drawings.

In this respect, before explaining the current embodiments of the illuminated safety harness in detail, it is to be understood that the illuminated safety harness is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the illuminated safety harness.

It is therefore important that the claims be regarded as including such equivalent construction insofar as they do not depart from the spirit and scope of the illuminated safety harness. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
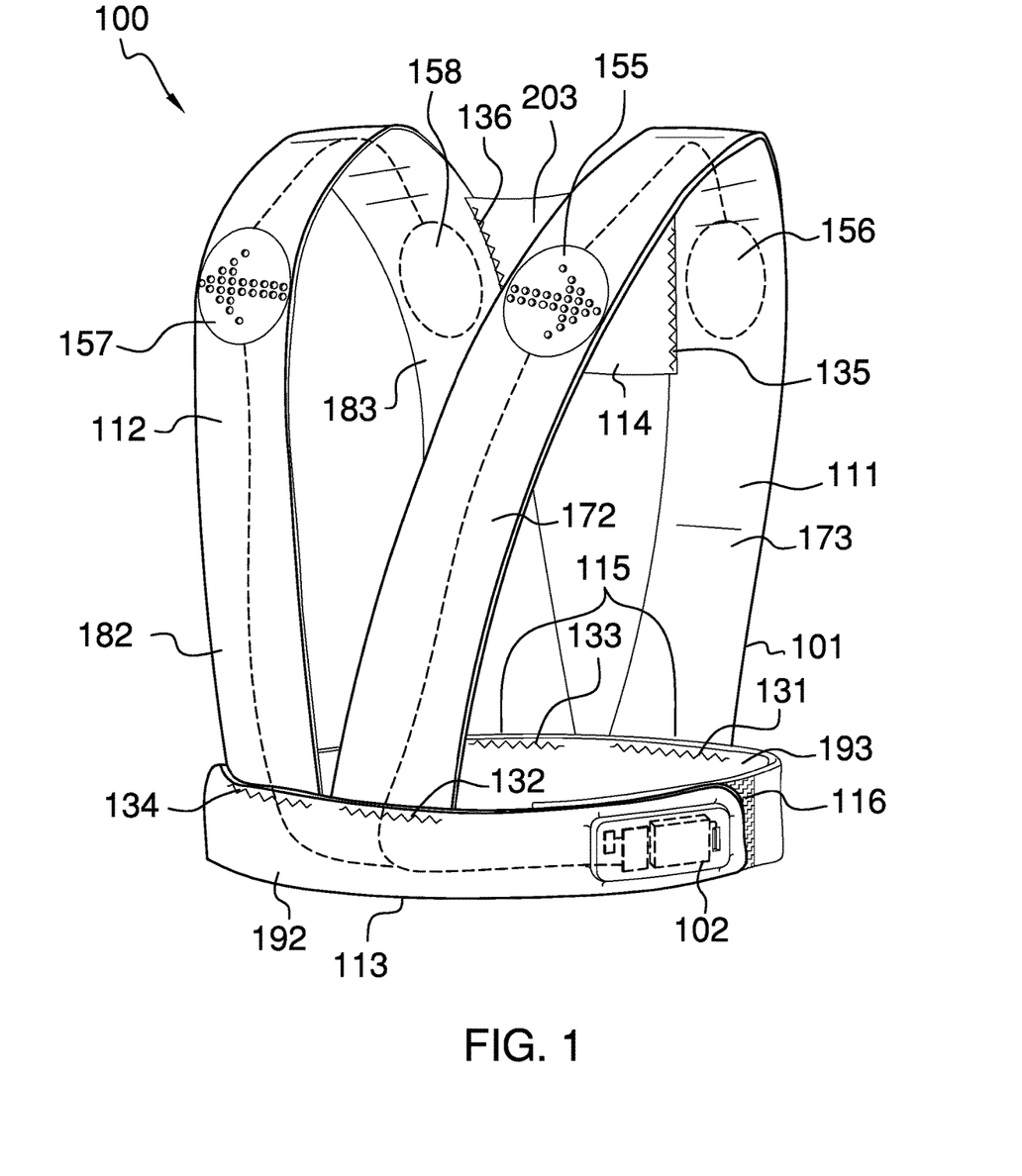
FIG. 1 is a perspective view of an embodiment of the disclosure.
Figure 2:
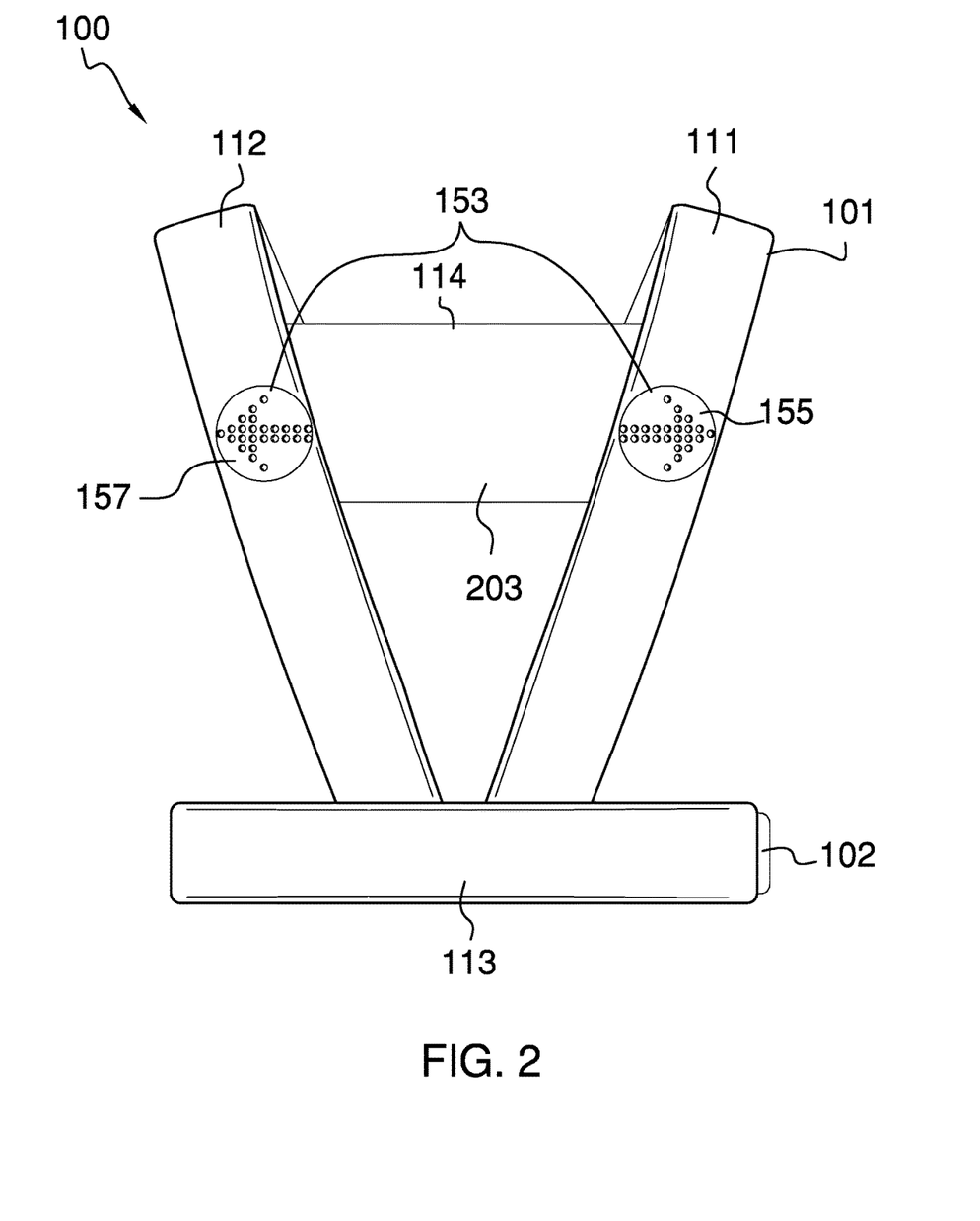
FIG. 2 is a front view of an embodiment of the disclosure.
Figure 3:
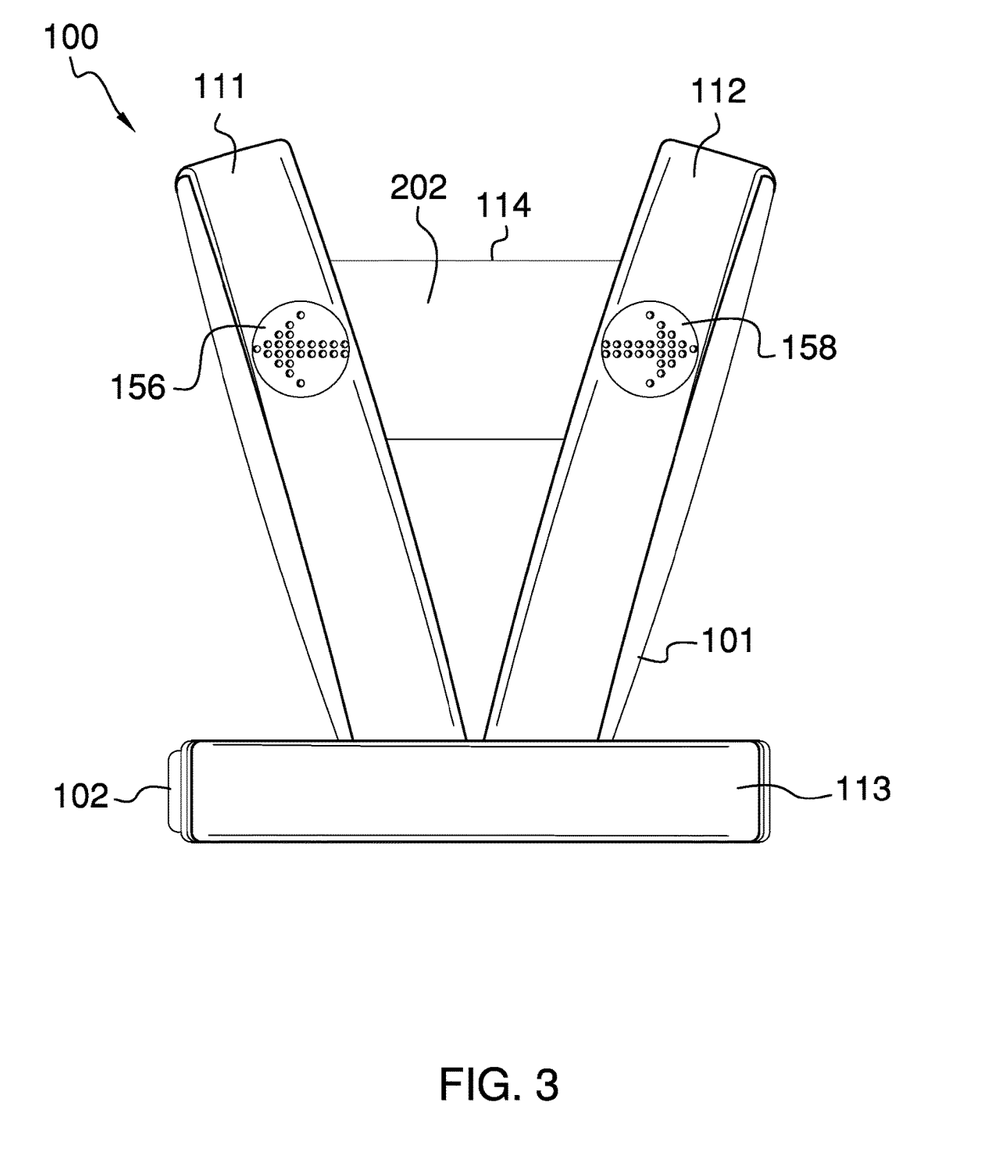
FIG. 3 is a rear view of an embodiment of the disclosure.
Figure 4:
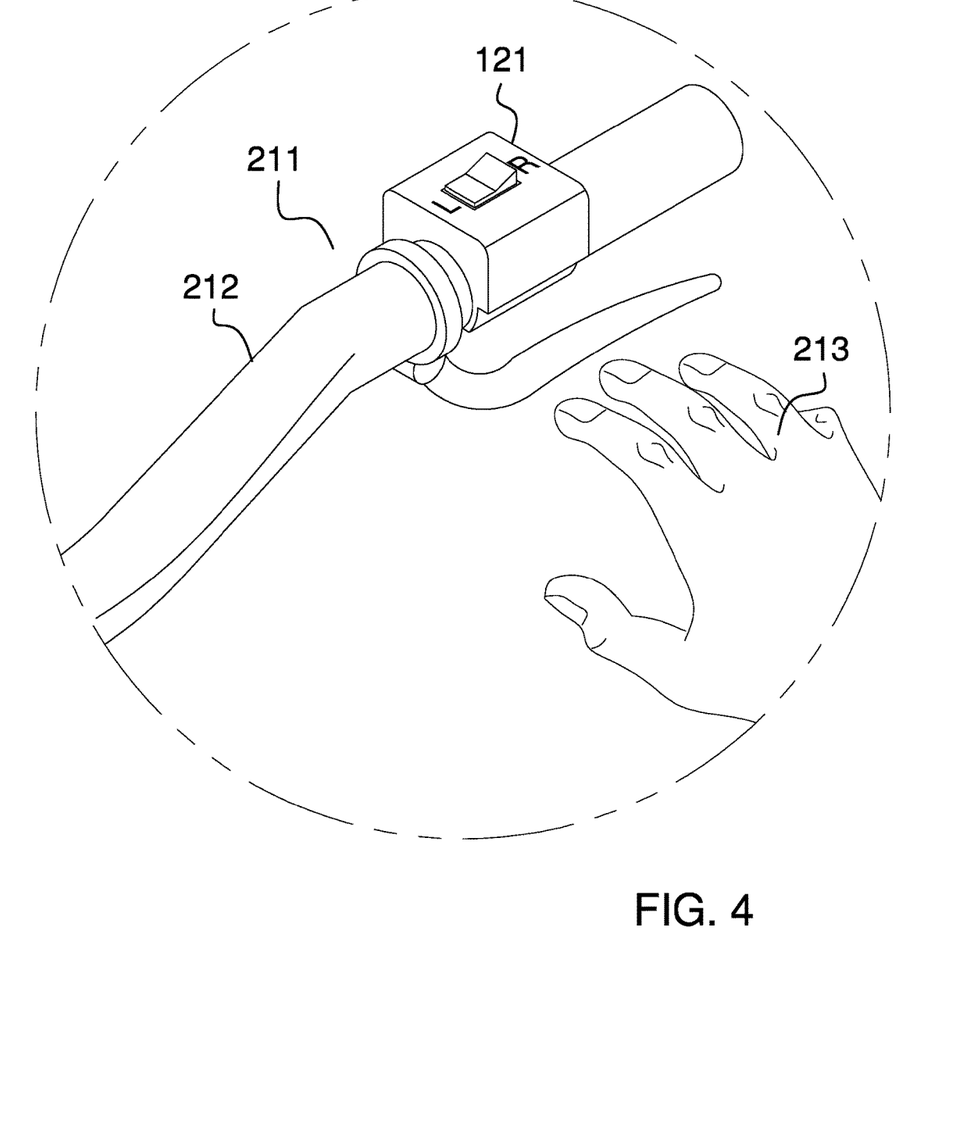
FIG. 4 is a detail view of an embodiment of the disclosure.
Figure 5:
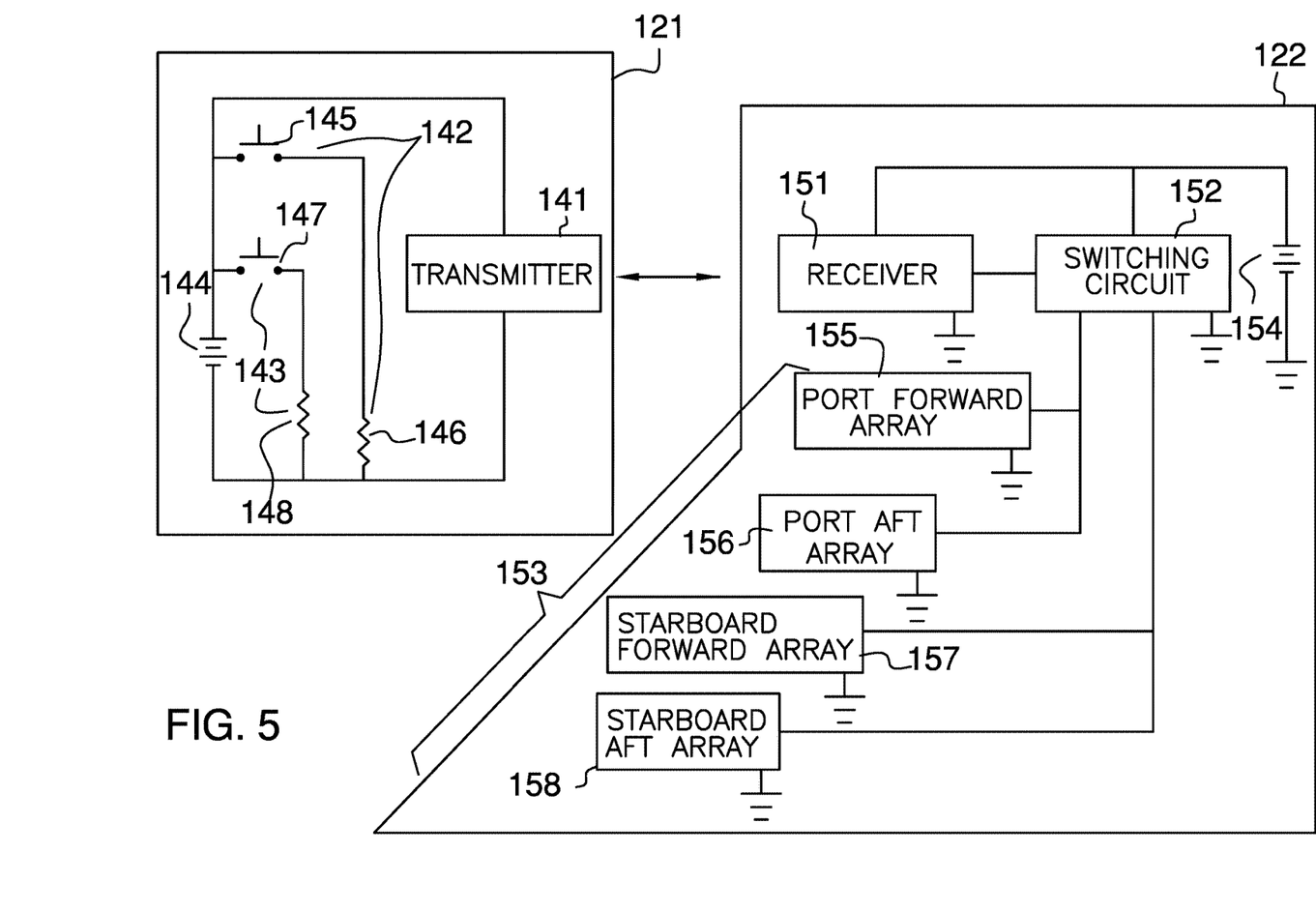
FIG. 5 is a block diagram of an embodiment of the disclosure.
Figure 6:
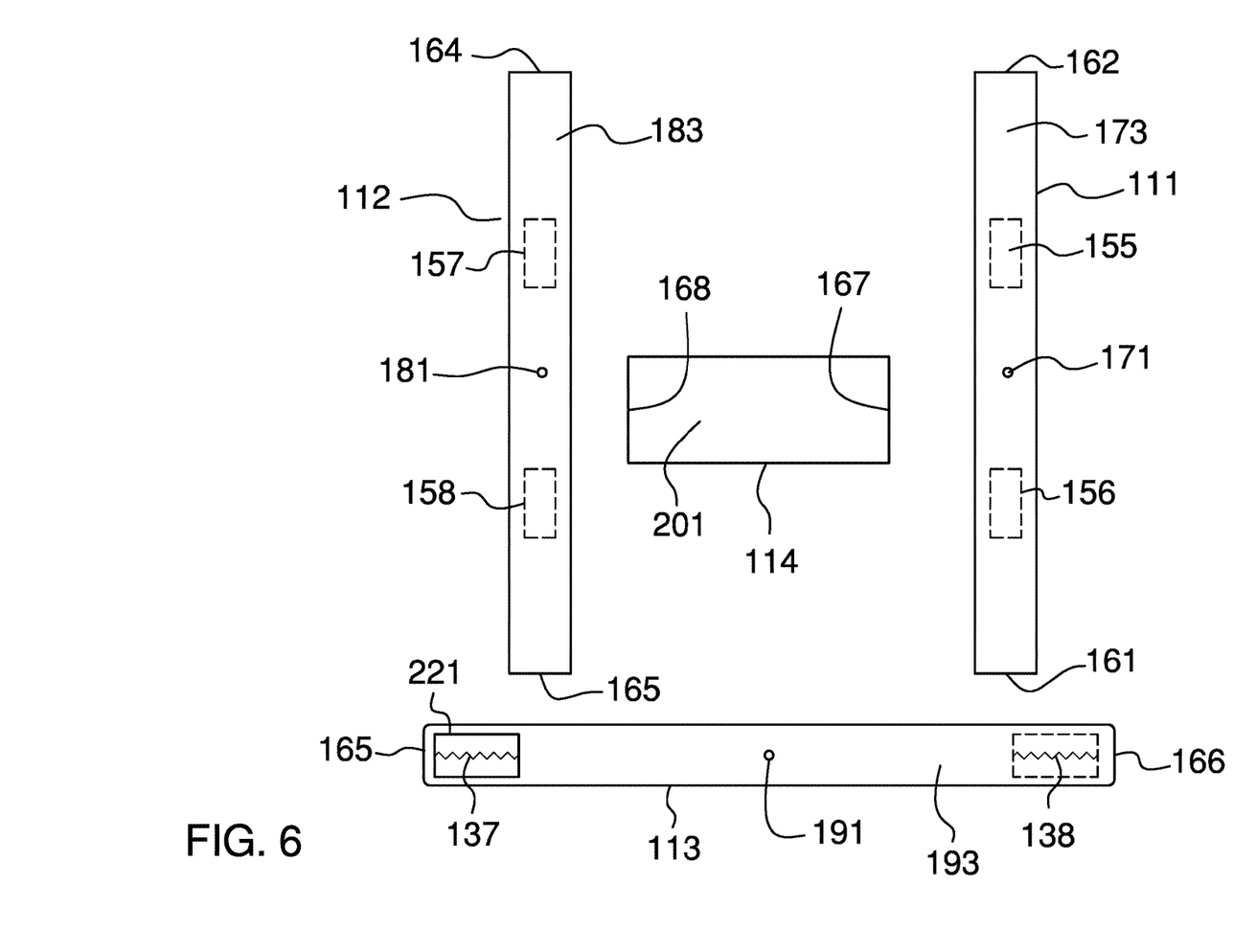
FIG. 6 is a detail view of an embodiment of the disclosure.

Detailed reference will now be made to one or more potential embodiments of the disclosure, which are illustrated in FIGS. 1 through 6.

The illuminated safety harness 100 (hereinafter invention) is a garment. The invention 100 is worn as personal protective equipment. The invention 100 is configured for use with a bicycle 211. The bicycle 211 is further defined with a handlebar 212. A rider 213 rides the bicycle 211. The invention 100 provides a plurality of illuminated traffic control signals 153 that indicates an intention to change the direction of travel of the bicycle 211. The plurality of illuminated traffic control signals 153 are wirelessly controlled. The wireless control of the plurality of illuminated traffic control signals 153 is accessible from the handlebar 212 of the bicycle 211. The invention 100 comprises a harness 101 and a safety circuit 102. The harness 101 forms the garment worn by the rider 213. The safety circuit 102 generates the plurality of illuminated traffic control signals 153. A portion of the safety circuit 102 mounts on the handlebar 212. A portion of the safety circuit 102 mounts on the harness 101.

The harness 101 is an open garment. The harness 101 is worn over the torso of the rider 213. The harness 101 displays the plurality of illuminated traffic control signals 153 such that the plurality of illuminated traffic control signals 153 will display an intended change of direction of the bicycle 211. The harness 101 comprises a port webbing 111, a starboard webbing 112, a belt webbing 113, a stay webbing 114, and a plurality of seams 115.

The port webbing 111 is further defined with a first end 161 and a second end 162. The port webbing 111 is additionally defined with a port center point 171, a port exterior face 172, and a port interior face 173. The port center point 171 is the point defined as the first moment of the port webbing 111. The port exterior face 172 is the face of the port webbing 111 that is distal from the port interior face 173. The port interior face 173 is the face of the port webbing 111 that is proximal to the rider 213 when the invention 100 is worn normally.

The starboard webbing 112 is further defined with a third end 163 and a fourth end 164. The starboard webbing 112 is additionally defined with a starboard center point 181, a starboard exterior face 182, and a starboard interior face 183. The starboard center point 181 is the point defined as the first moment of the starboard webbing 112. The starboard exterior face 182 is the face of the starboard webbing 112 that is distal from the starboard interior face 183. The starboard interior face 183 is the face of the starboard webbing 112 that is proximal to the rider 213 when the invention 100 is worn normally.

The belt webbing 113 is further defined with a fifth end 165 and a sixth end 166. The belt webbing 113 is additionally defined with a belt center point 191, a belt exterior face 192, and a belt interior face 193. The belt center point 191 is the point defined as the first moment of the belt webbing 113. The belt exterior face 192 is the face of the belt webbing 113 that is distal from the belt interior face 193. The belt interior face 193 is the face of the belt webbing 113 that is proximal to the rider 213 when the invention 100 is worn normally.

The stay webbing 114 is further defined with a seventh end 167 and an eighth end 168. The stay webbing 114 is additionally defined with a stay center point 201, a stay exterior face 202, and a stay interior face 203. The stay center point 201 is the point defined as the first moment of the stay webbing 114. The stay exterior face 202 is the face of the stay webbing 114 that is distal from the stay interior face 203. The stay interior face 203 is the face of the stay webbing 114 that is proximal to the rider 213 when the invention 100 is worn normally.

The port webbing 111 is a commercially available webbing. The port webbing 111 drapes over the port shoulder of the rider 213. The port webbing 111 suspends the belt webbing 113 from the port shoulder of the rider 213. The starboard webbing 112 is a commercially available webbing. The starboard webbing 112 drapes over the starboard shoulder of the rider 213. The starboard webbing 112 suspends the belt webbing 113 from the starboard shoulder of the rider 213. The belt webbing 113 is a commercially available webbing. The belt webbing 113 wraps around the waist of the rider 213. The stay webbing 114 is a commercially available webbing. The stay webbing 114 attaches the port webbing 111 to the starboard webbing 112 such that the span of the distance between the port center point 171 of the port webbing 111 and the starboard center point 181 of the starboard webbing 112 is less than or equal to a maximum distance.

Each of the plurality of seams 115 is a sewn seam. Each seam selected from the plurality of seams 115 attaches a first object to a second object. The first object is selected from the group consisting of the plurality of seams 115, the port webbing 111, the starboard webbing 112, the belt webbing 113, the stay webbing 114, and the fastener 116. The second object is selected from the group consisting of the plurality of seams 115, the port webbing 111, the starboard webbing 112, the belt webbing 113, the stay webbing 114, and the fastener 116. The second object is selected such that the second object is different from the first object. Stated differently, a seam selected from the plurality of seams 115 does not attach the first object to itself.

The fastener 116 is a fastening device that attaches the belt webbing 113 around the waist of the rider 213. The fastener 116 attaches the fifth end 165 of the belt webbing 113 to the sixth end 166 of the belt webbing 113 such that the belt webbing 113 forms a loop around the waist of the rider 213. The belt webbing 113 further comprises a fastener 116.

The fastener 116 further comprises a first hook/loop surface 221 and a second hook/loop surface 222. The first hook/loop surface 221 forms a first connecting surface of the fastener 116. The second hook/loop surface 222 forms a second connecting surface of the fastener 116. The hook and loop fastener and the hook/loop surface are defined in greater detail elsewhere in this disclosure.

The plurality of seams 115 comprises a first seam 131, a second seam 132, a third seam 133, a fourth seam 134, a fifth seam 135, a sixth seam 136, a seventh seam 137, and an eighth seam 138. The first seam 131 attaches the port webbing 111 to the belt webbing 113. The second seam 132 attaches the port webbing 111 to the belt webbing 113. The third seam 133 attaches the starboard webbing 112 to the belt webbing 113. The fourth seam 134 attaches the starboard webbing 112 to the belt webbing 113. The fifth seam 135 attaches the stay webbing 114 to the port webbing 111. The sixth seam 136 attaches the stay webbing 114 to the starboard webbing 112. The seventh seam 137 attaches the fastener 116 to the belt webbing 113. The eighth seam 138 attaches the fastener 116 to the belt webbing 113.

The safety circuit 102 is an electrical circuit. The safety circuit 102 contains the plurality of illuminated traffic control signals 153. The safety circuit 102 controls the operation of the plurality of illuminated traffic control signals 153. The safety circuit 102 comprises a transmitting circuit 121 and a receiving circuit 122.

The transmitting circuit 121 is an electrical circuit. The transmitting circuit 121 is contained in a housing that attaches to the handlebar 212 of the bicycle 211. The transmitting circuit 121 receives a signal generated by the rider 213 indicating an intended change of the direction of the bicycle 211 anticipated by the rider 213. The transmitting circuit 121 transmits a radio signal to the receiving circuit 122 indicating the new direction of the anticipated change. The transmitting circuit 121 comprises a transmitter 141, a port signal 142, a starboard signal 143, and a transmitter 141 battery 144.

In the first potential embodiment of the disclosure, the transmitting circuit 121 and portions of the receiving circuit 122 are provisioned using a 433 MHz remote control switch and transmitter commonly marketed as a radio frequency remote control relays.

The transmitter 141 is an electrical circuit. The transmitter 141 transmits a radio signal to the receiving circuit 122. The radio signal transmitted by the transmitter 141 indicates to the receiving circuit 122 which of the one or more illuminated traffic control signals selected from the plurality of illuminated traffic control signals 153 should be illuminated.

The port signal 142 is an interface used by the rider 213. The port signal 142 generates a voltage signal to the transmitter 141 that indicates an intention to turn the bicycle 211 in the port direction. The port signal 142 comprises a port switch 145 and a port load resistor 146. The port switch 145 is a momentary switch. The port switch 145 forms a series electrical connection between the positive terminal of the transmitter 141 battery 144 and the port load resistor 146. The port load resistor 146 is an electrical device. The port load resistor 146 forms a series electrical connection between the negative terminal of the transmitter 141 battery 144 and the port switch 145. The transmitter 141 receives a control signal from the port signal 142 as the voltage between the port switch 145 and the port load resistor 146.

The starboard signal 143 is an interface used by the rider 213. The starboard signal 143 generates a voltage signal to the transmitter 141 that indicates an intention to turn the bicycle 211 in the starboard direction. The starboard signal 143 comprises a starboard switch 147 and a starboard load resistor 148. The starboard switch 147 is a momentary switch. The starboard switch 147 forms a series electrical connection between the positive terminal of the transmitter 141 battery 144 and the starboard load resistor 148. The starboard load resistor 148 is an electrical device. The starboard load resistor 148 forms a series electrical connection between the negative terminal of the transmitter 141 battery 144 and the starboard switch 147. The transmitter 141 receives a control signal from the starboard signal 143 as the voltage between the starboard switch 147 and the starboard load resistor 148.

The transmitter 141 battery 144 is a chemical device that converts chemical potential energy into electrical energy. The transmitter 141 battery 144 powers the transmitter 141, the port signal 142, and the starboard signal 143.

The receiving circuit 122 is an electrical circuit. The receiving circuit 122 is contained in a housing that attaches to the harness 101. The receiving circuit 122 receives the radio signal transmitted by the transmitting circuit 121. The receiving circuit 122 illuminates one or more illuminated traffic control signals selected from the plurality of illuminated traffic control signals 153. The selection of the specific one or more illuminated traffic control signals by the receiving circuit 122 is determined from the radio signal transmitted by the transmitting circuit 121. The receiving circuit 122 comprises a receiver 151, a switching circuit 152, a plurality of illuminated traffic control signals 153, and a receiver 151 battery 154.

The receiver 151 is an electrical circuit. The receiver 151 receives the radio signal from the transmitter 141. The receiver 151 transmits the received radio signal as an input signal to the switching circuit 152. The switching circuit 152 is a logic circuit. The switching circuit 152 is an electrical circuit. The switching circuit 152 receives a control signal from the receiver 151. The switching circuit 152 illuminates one or more illuminated traffic control signals selected from the plurality of illuminated traffic control signals 153. The switching circuit 152 controls the plurality of illuminated traffic control signals 153. The selected control voltages for the one or more illuminated traffic control signals are determined by the control signals received by the switching circuit 152 from the receiver 151. The receiver 151 and the switching circuit 152 are provisioned using the 433 MHz remote control switch and transmitter commonly marketed as a radio frequency remote control relays.

Each of the plurality of illuminated traffic control signals 153 comprises a collection of LEDs. Each of the plurality of illuminated traffic control signals 153 creates an illuminated image. The illuminated image is of an arrow. The image of each of the plurality of illuminated traffic control signals 153 forms a sentiment indicating that the rider 213 intends to move in a lateral direction selected from the group consisting of the port direction and the starboard direction. The plurality of illuminated traffic control signals 153 are distributed on the harness 101 such that the sentiment indicated by the plurality of illuminated traffic control signals 153 are visible over a 360-degree field of illumination. Methods to form each of the plurality of illuminated traffic control signals 153 are well-known and documented in the electrical arts.

The plurality of illuminated traffic control signals 153 comprises a port forward array 155, a port aft array 156, a starboard forward array 157, and a starboard aft array 158.

The port forward array 155 is an illuminated traffic control signal selected from the plurality of illuminated traffic control signals 153. The port forward array 155 attaches to the harness 101 such that the port forward array 155 is visible on the anterior side of the rider 213. The port forward array 155 displays an image pointing towards the port side of the bicycle 211. The port forward array 155 attaches to the port exterior face 172 of the port webbing 111.

The port aft array 156 is an illuminated traffic control signal selected from the plurality of illuminated traffic control signals 153. The port aft array 156 attaches to the harness 101 such that the port aft array 156 is visible on the posterior side of the rider 213. The port aft array 156 displays an image pointing towards the port side of the bicycle 211. The port aft array 156 attaches to the port exterior face 172 of the port webbing 111.

The starboard forward array 157 is an illuminated traffic control signal selected from the plurality of illuminated traffic control signals 153. The starboard forward array 157 attaches to the harness 101 such that the starboard forward array 157 is visible on the anterior side of the rider 213. The starboard forward array 157 displays an image pointing towards the starboard side of the bicycle 211. The starboard forward array 157 attaches to the starboard exterior face 182 of the starboard webbing 112.

The starboard aft array 158 is an illuminated traffic control signal selected from the plurality of illuminated traffic control signals 153. The starboard aft array 158 attaches to the harness 101 such that the starboard aft array 158 is visible on the posterior side of the rider 213. The starboard aft array 158 displays an image pointing towards the starboard side of the bicycle 211. The starboard aft array 158 attaches to the starboard exterior face 182 of the starboard webbing 112.

The receiver 151 battery 154 is a chemical device that converts chemical potential energy into electrical energy. The receiver 151 battery 154 powers the receiver 151, the switching circuit 152, and the plurality of illuminated traffic control signals 153.

The design of the safety circuit 102 calls for the receiving circuit 122 to illuminate the port forward array 155 and the port aft array 156 when the port switch 145 is actuated. The receiving circuit 122 illuminates the starboard forward array 157 and the starboard aft array 158 when the starboard switch 147 is actuated.

The following two paragraphs describe the assembly of the harness 101.

The first seam 131 attaches the first end 161 of the port webbing 111 to the belt webbing 113 at a location between the belt center point 191 and the sixth end 166 of the belt webbing 113. The second seam 132 attaches the second end 162 of the port webbing 111 to the belt webbing 113 at a location between the belt center point 191 and the sixth end 166 of the belt webbing 113. The third seam 133 attaches the third end 163 of the starboard webbing 112 to the belt webbing 113 at a location between the belt center point 191 and the fifth end 165 of the belt webbing 113. The fourth seam 134 attaches the fourth end 164 of the starboard webbing 112 to the belt webbing 113 at a location between the belt center point 191 and the fifth end 165 of the belt webbing 113.

The fifth seam 135 attaches the seventh end 167 of the stay webbing 114 to the port interior face 173 of the port webbing 111. The sixth seam 136 attaches the eighth end 168 of the stay webbing 114 to the starboard interior face 183 of the starboard webbing 112. The seventh seam 137 attaches the first hook/loop surface 221 of the fastener 116 to the fifth end 165 of the belt webbing 113. The eighth seam 138 attaches the second hook/loop surface 222 of the fastener 116 to the sixth end 166 of the belt webbing 113.

The following definitions were used in this disclosure:

Aft: As used in this disclosure, aft is a term that relates a first object to a second object. When the second object is closer to the stern of a vehicle, the second object is said to be aft of the first object. The term is commonly used on vessels and vehicles.

Anterior: As used in this disclosure, anterior is a term that is used to refer to the front side or direction of a structure. When comparing two objects, the anterior object is the object that is closer to the front of the structure.

Battery: As used in this disclosure, a battery is a chemical device consisting of one or more cells, in which chemical energy is converted into electricity and used as a source of power. Batteries are commonly defined with a positive terminal and a negative terminal.

Bicycle: As used in this disclosure, a bicycle is a commercially available vehicle with two wheels. The bicycle is a self-powered vehicle intended for carrying one or two passengers.

Bow: As used in this disclosure, the bow refers to the anterior side of a vehicle or vessel. See aft, forward, port, starboard, and stern Diode: As used in this disclosure, a diode is a two terminal semiconductor device that allows current flow in only one direction. The two terminals are called the anode and the cathode. Electric current is allowed to pass from the anode to the cathode.

Fastener: As used in this disclosure, a fastener is a device that is used to join or affix two objects. Fasteners generally comprise a first element which is attached to the first object and a second element which is attached to the second object such that the first element and the second element join to removably attach the first object and the second object. Common fasteners include, but are not limited to, hooks, zippers, magnets, snaps, buttons, buckles, quick release buckles, or hook and loop fasteners.

Field of Illumination: As used in this disclosure, a field of illumination refers to an area illuminated by electromagnetic radiation projected from an electrical device such as a lamp or transmission antenna.

Force of Gravity: As used in this disclosure, the force of gravity refers to a vector that indicates the direction of the pull of gravity on an object at or near the surface of the earth.

Forward: As used in this disclosure, forward is a term that relates a first object to a second object. When the first object is closer to the bow of a vehicle, the first object is said to be forward of the second object. The term is commonly used on vessels and vehicles. See bow, aft, port, starboard, and stern Harness: As used in this disclosure, a harness is an apparatus comprising a plurality of straps and one or more fasteners that are used to fasten or anchor a first person or first object to a second object. The phrase N point harness refers to the installation of the harness wherein the harness has N anchor points. For example, a 2 point harness has two anchor points while a 5 point harness has five anchor points.

Hook and Loop Fastener: As used in this disclosure, a hook and loop fastener is a fastener that comprises a hook surface and a loop surface. The hook surface comprises a plurality of minute hooks. The loop surface comprises a surface of uncut pile that acts as a plurality of loops. When the hook surface is applied to the loop surface, the plurality of minute hooks fastens to the plurality of loops securely fastening the hook surface to the loop surface. A note on usage: when fastening two objects the hook surface of a hook and loop fastener will be placed on the first object and the matching loop surface of a hook and loop fastener will be placed on the second object without significant regard to which object of the two objects is the first object and which of the two objects is the second object. When the hook surface of a hook and loop fastener or the loop surface of a hook and loop fastener is attached to an object this will simply be referred to as the "hook/loop surface" with the understanding that when the two objects are fastened together one of the two objects will have a hook surface, and the remaining object will have the loop surface.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Image: As used in this disclosure, an image is an optical representation or reproduction of an indicia or of the appearance of something or someone.

Indicia: As used in this disclosure, the term indicia refers to a set of markings that identify a sentiment.

Inferior: As used in this disclosure, the term inferior refers to a directional reference that is parallel to and in the same direction as the force of gravity when an object is positioned or used normally.

Lateral: As used in this disclosure, the term lateral refers to the movement of an object that is perpendicular to the primary sense of direction of an object and parallel to the horizontal plane (or perpendicular to the vertical plane). Lateral movement is always perpendicular to the anterior-posterior axis. Lateral movement is often called sideways movement.

LED: As used in this disclosure, an LED is an acronym for a light emitting diode. A light emitting diode is a diode that is also a light source.

Load Resistor: As used in this disclosure, a load resistor is an electrical resistor that is used to present a voltage to an electrical device. The presented voltage is controlled by controlling the amount of electrical current passing through the load resistor.

Momentary Switch: As used in this disclosure, a momentary switch is a biased switch in the sense that the momentary switch has a baseline position that only changes when the momentary switch is actuated (for example when a pushbutton switch is pushed or a relay coil is energized). The momentary switch then returns to the baseline position once the actuation is completed. This baseline position is called the "normal" position. For example, a "normally open" momentary switch interrupts (open) the electric circuit in the baseline position and completes (closes) the circuit when the momentary switch is activated. Similarly, a "normally closed" momentary switch will complete (close) an electric circuit in the baseline position and interrupt (open) the circuit when the momentary switch is activated.

Personal Protective Equipment: As used in this disclosure, personal protective equipment refers to the use of protective garments or protective equipment that is designed to protect the wearer's body from injury. Personal protective equipment may be designed for occupational protection, including, but not limited to, equipment to protect military, police, or firefighting personnel, or may be designed to provide protection in sports or recreational activities, including, but not limited to, equipment to protect participants in football, hockey, or soccer activities.

Port: As used in this disclosure, port refers to the left side of a vehicle when a viewer is facing towards the primary sense of direction of the vehicle. See bow, forward, aft, starboard, and stern Posterior: As used in this disclosure, posterior is a term that is used to refer to the side of an object that is distal or in the opposite direction of the anterior side. When comparing two items, the posterior item is the item that is distal from the anterior of the object.

Primary Sense of Direction: As used in this disclosure, the primary sense of direction of an object refers to a vector that: 1) passes through the center of the object; and, 2) is parallel to the direction of travel when the anterior surface(s) of the object are leading the object into the direction of travel. This definition intends to align with what people would normally call the forward direction of an object.

Receiver: As used in this disclosure, a receiver is a device that is used to receive and demodulate electromagnetic radiation such as radio signals.

Remote Control: As used in this disclosure, remote control means the establishment of control of a device from a distance. Remote control is generally accomplished through the use of an electrical device that generates electrically based control signals that are transmitted via radio frequencies or other means to the device.

Resistor: As used in this disclosure, a resistor is a well-known and commonly available electrical device that inhibits the flow of electricity through an electric circuit. Within an electric circuit processing alternating currents, the resistor will not affect the phase of the alternating current. A current flowing through a resistor will create a voltage across the terminals of the resistor.

Seam: As used in this disclosure, a seam is a joining of: 1) a first textile to a second textile; 2) a first sheeting to a second sheeting; or, 3) a first textile to a first sheeting. Potential methods to form seams include, but are not limited to, a sewn seam, a heat bonded seam, an ultrasonically bonded seam, or a seam formed using an adhesive.

Sentiment: As used in this disclosure, a sentiment refers to a symbolic meaning or message that is communicated through the use of an image, potentially including a text-based image.

Sewn Seam: As used in this disclosure, a sewn seam a method of attaching two or more layers of textile, leather, or other material through the use of a thread, a yarn, or a cord that is repeatedly inserted and looped through the two or more layers of textile, leather, or other material.

Starboard: As used in this disclosure, starboard refers to the right side of a vehicle when a viewer is facing towards the primary sense of direction of the vehicle.

Stern: As used in this disclosure, the stern refers to the aft or posterior side of a vehicle or vessel.

Superior: As used in this disclosure, the term superior refers to a directional reference that is parallel to and in the opposite direction of the force of gravity when an object is positioned or used normally.

Switch: As used in this disclosure, a switch is an electrical device that starts and stops the flow of electricity through an electric circuit by completing or interrupting an electric circuit. The act of completing or breaking the electrical circuit is called actuation. Completing or interrupting an electric circuit with a switch is often referred to as closing or opening a switch respectively. Completing or interrupting an electric circuit is also often referred to as making or breaking the circuit respectively.

Switching Circuit: As used in this disclosure, a switching circuit is a non-programmable electrical device that receives one or more digital or analog inputs and uses those digital or analog inputs to generate one or more digital or analog outputs.

Textile: As used in this disclosure, a textile is a material that is woven, knitted, braided or felted. Synonyms in common usage for this definition include fabric and cloth.

Transmitter: As used in this disclosure, a transmitter is a device that is used to generate and transmit electromagnetic radiation such as radio signals.

Vehicle: As used in this disclosure, a vehicle is a device used for transporting passengers, goods, or equipment. The term motorized vehicle refers to a vehicle can move under power provided by an electric motor or an internal combustion engine.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

Webbing: As used in this disclosure, a webbing is strong, close woven or knitted fabric that is used for straps or belting. As used in this disclosure, webbing is a fully formed material that is only cut to length for use. Webbing is not formed by cutting broader materials into strips. Webbings have tensile strength but are too flexible to provide compressive strength and are not suitable for use in pushing objects. The two surfaces of a webbing with the greatest surface area are called the faces of the webbing.

With respect to the above description, it is to be realized that the optimum dimensional relationship for the various components of the invention described above and in FIGS. 1 through 6 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. An illuminated safety garment comprising:
    a harness and a safety circuit;
    wherein the harness forms a garment that is adapted to be worn by a rider who rides a bicycle;
    wherein the illuminated safety garment is personal protective equipment;
    wherein the bicycle is further defined with a handlebar;
    wherein the illuminated safety garment provides a plurality of illuminated traffic control signals;

wherein the plurality of illuminated traffic control signals are wirelessly controlled;
wherein the wireless control of the plurality of illuminated traffic control signals is accessible from the handlebar of the bicycle;
wherein the safety circuit generates the plurality of illuminated traffic control signals;
wherein the harness is an open garment;
wherein the harness is worn over the torso of the rider;
wherein the harness displays the plurality of illuminated traffic control signals;
wherein the safety circuit is an electrical circuit;
wherein the safety circuit contains the plurality of illuminated traffic control signals;
wherein the safety circuit controls the operation of the plurality of illuminated traffic control signals;
wherein the harness comprises a port webbing, a starboard webbing, a belt webbing, a stay webbing, and a plurality of seams;
wherein the belt webbing further comprises a fastener;
wherein the plurality of seams interconnect the port webbing, the starboard webbing, the belt webbing, the stay webbing, and the fastener;
wherein the port webbing is further defined with a first end and a second end;
wherein the port webbing is additionally defined with a port center point, a port exterior face, and a port interior face;
wherein the starboard webbing is further defined with a third end and a fourth end;
wherein the starboard webbing is additionally defined with a starboard center point, a starboard exterior face, and a starboard interior face;
wherein the belt webbing is further defined with a fifth end and a sixth end;
wherein the belt webbing is additionally defined with a belt center point, a belt exterior face, and a belt interior face;
wherein the stay webbing is further defined with a seventh end and an eighth end;
wherein the stay webbing is additionally defined with a stay center point, a stay exterior face, and a stay interior face.

2. The illuminated safety garment according to claim 1
wherein the port webbing is a textile webbing;
wherein the port webbing drapes over a shoulder of the rider;
wherein the port webbing suspends the belt webbing from the shoulder of the rider;
wherein the starboard webbing is a textile webbing;
wherein the starboard webbing drapes over a shoulder of the rider;
wherein the starboard webbing suspends the belt webbing from the shoulder of the rider.

3. The illuminated safety garment according to claim 2
wherein the belt webbing is a textile webbing;
wherein the belt webbing wraps around the waist of the rider;
wherein the stay webbing is a textile webbing;
wherein the stay webbing attaches the port webbing to the starboard webbing such that the span of the distance between the port center point of the port webbing and the starboard center point of the starboard webbing is less than or equal to a maximum distance.

4. The illuminated safety garment according to claim 3
wherein each of the plurality of seams is a sewn seam;
wherein each seam selected from the plurality of seams attaches a first object to a second object;
wherein the first object is selected from the group consisting of the plurality of seams, the port webbing, the starboard webbing, the belt webbing, the stay webbing, and the fastener;
wherein the second object is selected from the group consisting of the plurality of seams, the port webbing, the starboard webbing, the belt webbing, the stay webbing, and the fastener;
wherein the second object is selected such that the second object is different from the first object.

5. The illuminated safety garment according to claim 4
wherein the fastener is a fastening device that attaches the belt webbing around the waist of the rider;
wherein the fastener attaches the fifth end of the belt webbing to the sixth end of the belt webbing such that the belt webbing forms a loop around the waist of the rider;
wherein the fastener further comprises a first hook/loop surface and a second hook/loop surface;
wherein the first hook/loop surface forms a first connecting surface of the fastener;
wherein the second hook/loop surface forms a second connecting surface of the fastener.

6. The illuminated safety garment according to claim 5
wherein the plurality of seams comprises a first seam, a second seam, a third seam, a fourth seam, a fifth seam, a sixth seam, a seventh seam, and an eighth seam;
wherein the first seam attaches the port webbing to the belt webbing;
wherein the second seam attaches the port webbing to the belt webbing;
wherein the third seam attaches the starboard webbing to the belt webbing;
wherein the fourth seam attaches the starboard webbing to the belt webbing;
wherein the fifth seam attaches the stay webbing to the port webbing;
wherein the sixth seam attaches the stay webbing to the starboard webbing;
wherein the seventh seam attaches the fastener to the belt webbing;
wherein the eighth seam attaches the fastener to the belt webbing.

7. The illuminated safety garment according to claim 6
wherein the safety circuit comprises a transmitting circuit and a receiving circuit;
wherein the transmitting circuit is an electrical circuit;
wherein the transmitting circuit is contained in a housing that attaches to the handlebar of the bicycle;
wherein the transmitting circuit receives a signal generated by the rider;
wherein the transmitting circuit transmits a radio signal to the receiving circuit;
wherein the receiving circuit is an electrical circuit;
wherein the receiving circuit is contained in a housing that attaches to the harness;
wherein the receiving circuit receives the radio signal transmitted by the transmitting circuit;
wherein the receiving circuit illuminates one or more illuminated traffic control signals selected from the plurality of illuminated traffic control signals;
wherein the selection of the specific one or more illuminated traffic control signals by the receiving circuit is determined from the radio signal transmitted by the transmitting circuit.

8. The illuminated safety garment according to claim 7
wherein the transmitting circuit comprises a transmitter, a port signal, a starboard signal, and a transmitter battery;
wherein the transmitter, the port signal, the starboard signal, and the transmitter battery are electrically interconnected;
wherein the transmitter is an electrical circuit;
wherein the transmitter transmits a radio signal to the receiving circuit;
wherein the radio signal transmitted by the transmitter indicates to the receiving circuit which of the one or more illuminated traffic control signals selected from the plurality of illuminated traffic control signals to illuminate.

9. The illuminated safety garment according to claim 8
wherein the port signal is an interface used by the rider;
wherein the port signal generates a voltage signal to the transmitter that indicates an intention to turn the bicycle in the port direction;
wherein the starboard signal is an interface used by the rider;
wherein the starboard signal generates a voltage signal to the transmitter that indicates an intention to turn the bicycle in the starboard direction;
wherein the port signal comprises a port switch and a port load resistor;
wherein the port switch is a momentary switch;
wherein the port load resistor is an electrical device;
wherein the port switch forms a series electrical connection between a positive terminal of the transmitter battery and the port load resistor;
wherein the port load resistor forms a series electrical connection between a negative terminal of the transmitter battery and the port switch;
wherein the transmitter receives a control signal from the port signal as the voltage between the port switch and the port load resistor.

10. The illuminated safety garment according to claim 9
wherein the starboard signal is an interface used by the rider;
wherein the starboard signal comprises a starboard switch and a starboard load resistor;
wherein the starboard switch is a momentary switch;
wherein the starboard switch forms a series electrical connection between the positive terminal of the transmitter battery and the starboard load resistor;
wherein the starboard load resistor is an electrical device;
wherein the starboard load resistor forms a series electrical connection between the negative terminal of the transmitter battery and the starboard switch;
wherein the transmitter receives a control signal from the starboard signal as the voltage between the starboard switch and the starboard load resistor.

11. The illuminated safety garment according to claim 10
wherein the transmitter battery is a chemical device that converts chemical potential energy into electrical energy;
wherein the transmitter battery powers the transmitter, the port signal, and the starboard signal.

12. The illuminated safety garment according to claim 11
wherein the receiving circuit comprises a receiver, a switching circuit, a plurality of illuminated traffic control signals, and a receiver battery;
wherein the receiver, the switching circuit, the plurality of illuminated traffic control signals, and the receiver battery are electrically interconnected;
wherein the receiver is an electrical circuit;
wherein the receiver receives the radio signal from the transmitter;
wherein the receiver transmits the received radio signal as an input signal to the switching circuit;
wherein the switching circuit is an electrical circuit;
wherein the switching circuit is a logic circuit;
wherein the switching circuit receives a control signal from the receiver;
wherein the switching circuit illuminates one or more illuminated traffic control signals selected from the plurality of illuminated traffic control signals.

13. The illuminated safety garment according to claim 12
wherein each of the plurality of illuminated traffic control signals comprises a collection of LEDs;
wherein each of the plurality of illuminated traffic control signals creates an illuminated image;
wherein the image of each of the plurality of illuminated traffic control signals forms a sentiment indicating that the rider intends to move the bicycle in a lateral direction selected from the group consisting of a port direction and a starboard direction;
wherein the plurality of illuminated traffic control signals are distributed on the harness such that the sentiment indicated by the plurality of illuminated traffic control signals are visible over a 360-degree field of illumination.

14. The illuminated safety garment according to claim 13
wherein the plurality of illuminated traffic control signals comprises a port forward array, a port aft array, a starboard forward array, and a starboard aft array;
wherein the port forward array attaches to the harness such that the port forward array is visible on the anterior side of the rider;
wherein the port forward array displays an image pointing towards the port side of the bicycle;
wherein the port forward array attaches to the port exterior face of the port webbing;
wherein the port aft array attaches to the harness such that the port aft array is visible on the posterior side of the rider;
wherein the port aft array displays an image pointing towards the port side of the bicycle;
wherein the port aft array attaches to the port exterior face of the port webbing;
wherein the starboard forward array attaches to the harness such that the starboard forward array is visible on the anterior side of the rider;
wherein the starboard forward array displays an image pointing towards the starboard side of the bicycle;
wherein the starboard forward array attaches to the starboard exterior face of the starboard webbing;
wherein the starboard aft array attaches to the harness such that the starboard aft array is visible on the posterior side of the rider;
wherein the starboard aft array displays an image pointing towards the starboard side of the bicycle;
wherein the starboard aft array attaches to the starboard exterior face of the starboard webbing.

15. The illuminated safety garment according to claim 14
wherein the receiver battery is a chemical device that converts chemical potential energy into electrical energy;
wherein the receiver battery powers the receiver, the switching circuit, and the plurality of illuminated traffic control signals.

16. The illuminated safety garment according to claim 15
wherein the receiving circuit illuminates the port forward array and the port aft array when the port switch is actuated;
wherein the receiving circuit illuminates the starboard forward array and the starboard aft array when the starboard switch is actuated.

17. The illuminated safety garment according to claim 16
wherein the first seam attaches the first end of the port webbing to the belt webbing at a location between the belt center point and the sixth end of the belt webbing;
wherein the second seam attaches the second end of the port webbing to the belt webbing at a location between the belt center point and the sixth end of the belt webbing;
wherein the third seam attaches the third end of the starboard webbing to the belt webbing at a location between the belt center point and the fifth end of the belt webbing;
wherein the fourth seam attaches the fourth end of the starboard webbing to the belt webbing at a location between the belt center point and the fifth end of the belt webbing;
wherein the fifth seam attaches the seventh end of the stay webbing to the port interior face of the port webbing;
wherein the sixth seam attaches the eighth end of the stay webbing to the starboard interior face of the starboard webbing;
wherein the seventh seam attaches the first hook/loop surface of the fastener to the fifth end of the belt webbing;
wherein the eighth seam attaches the second hook/loop surface of the fastener to the sixth end of the belt webbing.

* * * * *